Figure 1:
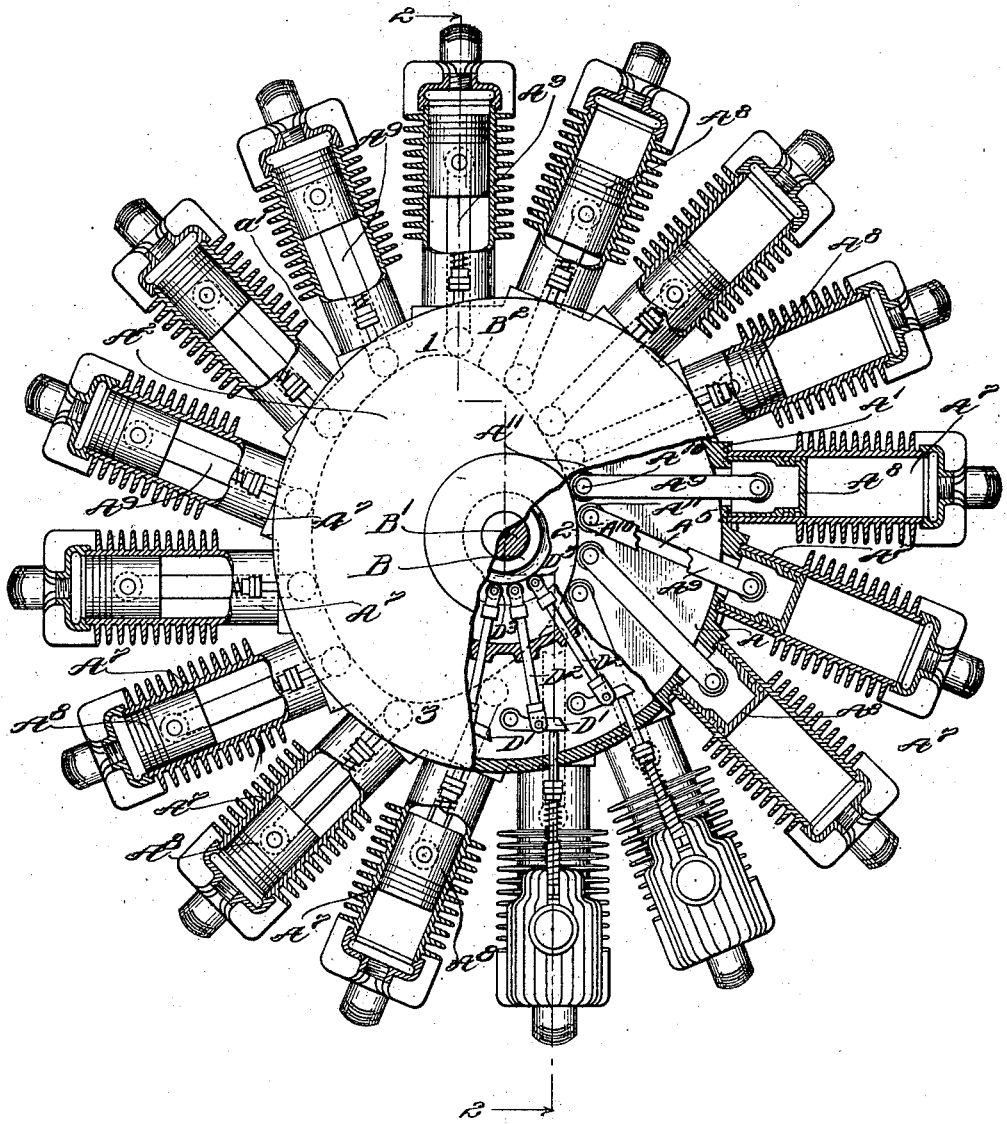

G. A. LOWRY.
ENGINE.
APPLICATION FILED MAY 7, 1910.

1,038,612.

Patented Sept. 17, 1912.

3 SHEETS—SHEET 1.

Witnesses:

Inventor:
George A. Lowry,
by Roberts, Roberts & Cushman
Att'ys.

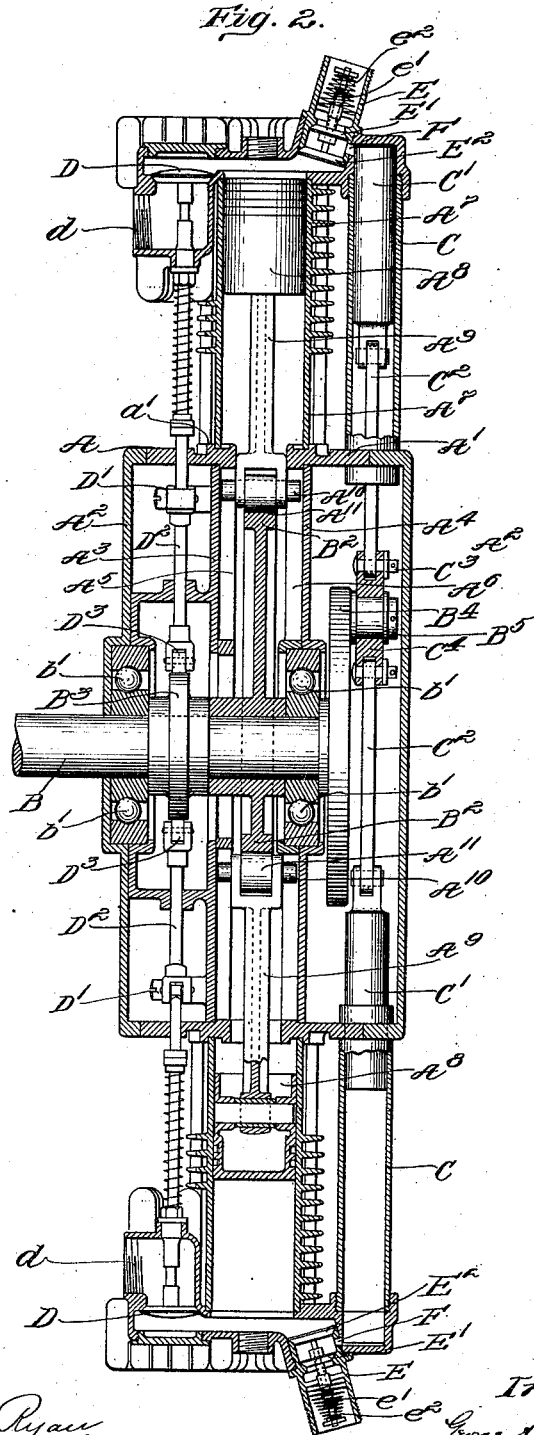

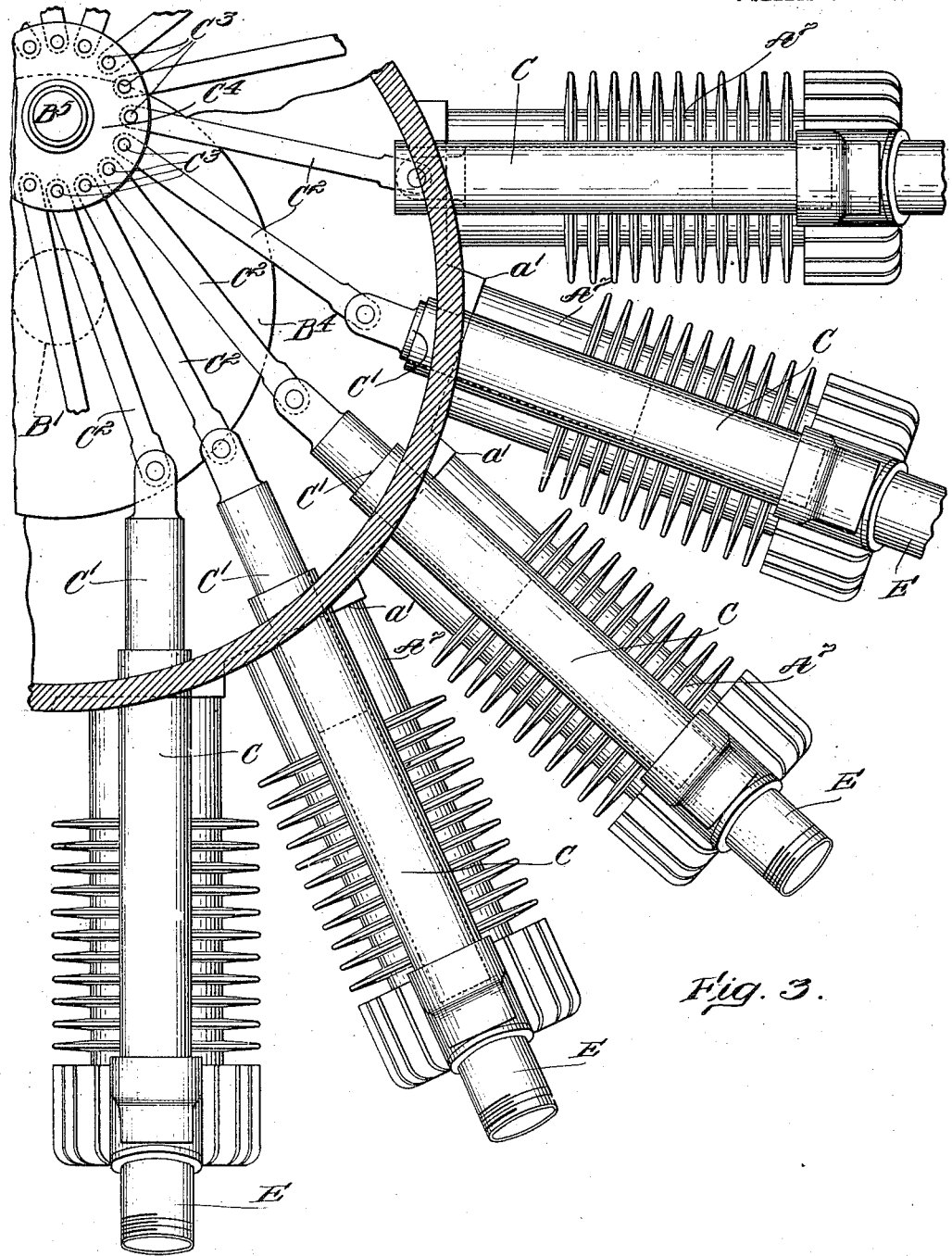

UNITED STATES PATENT OFFICE.

GEORGE A. LOWRY, OF PAWTUCKET, RHODE ISLAND.

ENGINE.

1,038,612.

Specification of Letters Patent. Patented Sept. 17, 1912.

Application filed May 7, 1910. Serial No. 559,970.

*To all whom it may concern:*

Be it known that I, GEORGE A. LOWRY, a citizen of the United States, and resident of Pawtucket, in the county of Providence and State of Rhode Island, have invented new and useful Improvements in Engines, of which the following is a specification.

My invention relates to the construction of engines for converting heat energy into energy of motion, in particular to internal combustion engines which employ a gaseous combustible mixture to develop heat energy in the engine itself, for immediate conversion into mechanical energy.

The main objects of my invention are, to secure the full advantage of the internal pressures in the engine, at all parts of its stroke, or active part of the cycle of motion, eliminating dead point and its disadvantages; to establish, in an internal combustion engine, a cycle which combines the advantages and avoids the disadvantages of the four cycle principle and those of the two cycle principle; to obtain the dynamic advantages of constant torque, to expand the working gases to, or nearly to, atmospheric pressure and thus to dispense, in internal combustion engines, with the usual muffler and the back pressure from retardation of the exhaust, to secure in internal combustion engines, a more thorough scavenging of the cylinder than has heretofore been the case, while providing a combustible charge and power stroke, at each travel of the engine piston from the head end of the cylinder; and to obtain a smaller ratio of engine-weight to horse-power than has heretofore been possible, without at the same time scanting materials and sacrificing essential strength and factor of safety.

It will be obvious upon perusal of the accompanying specifications, that some of the utilities and advantages of the improvements described may be secured and embodied in heat engines of various types, e. g. steam engines or gas engines, while others relate peculiarly to gas engines, or heat engines of the internal combustion type. As an engine of the latter type presents conditions favorable to the employment of the invention of which the objects are hereinabove recited, I will describe my improvements as applied to an internal combustion engine, and will confine the particulars of description to such an engine, as a concrete exemplification of my invention.

The principle on which my invention works is as follows:—Broadly speaking, my invention involves the reciprocal action and reaction of two relatively rotatable members, one of which carries the cylinder or preferably the cylinders, with pistons and piston-rods, while the other is provided with a cam-surface, against which the piston-rod bears, so that the coaction of the working parts of these two members involves the travel of the piston rods over the surface of the cam, and the reciprocations of the pistons by virtue of the eccentricity of the cam.

More particularly, and in reference to engines of the internal combustion type, the principle of my invention involves a cycle of movement of a piston characterized by a pause or dwell of the piston at or near the head end of its cylinder, during a large arc of the rotary movement. This is secured by providing the cam against which the piston rods operate, with a dwell over part of its periphery.

Again in its general aspect and application, the principle on which my invention works involves the maintenance of a constant crank-arm factor of moment, during the entire power stroke of a piston, so that the disadvantageous application of pressure at and near dead-points is eliminated.

In its aspect of special application to internal combustion engines, the principle of my invention involves also the preparation and compression outside the working cylinder, of a combustible charge, and the introduction of the charge to the cylinder while the piston is at rest, or substantially so, near the head end of the cylinder.

The functionally related factors which operate according to the above stated principles are illustrated in the accompanying drawings, wherein—

Figure 1 is a plan view, partly in section and partly broken away, of an internal combustion engine, Fig. 2 is a section taken on the line 2—2 of Fig. 1, and Fig. 3 is a plan view of a portion of the side of the engine in rear, or in reverse of Fig. 1.

The engine represented by the figures comprises two relatively rotatable active and reactive members, indicated comprehensively in Fig. 2 by A and B; A including by reference a casing, working cylinders attached thereto, with the appropriate pistons and piston rods, and also, in the example shown, auxiliary compression cylinders and their adjuncts; B being a shaft, with functional factors attached, in reactive relationship with the working parts of the member A. Neither of these two main members is shown as anchored, or stationary, for the reason that either may be secured to a stationary base or frame, leaving the other to act as the moving member; under some conditions it will be advisable to anchor the member A, under others the member B. Obviously the rotative relationship will remain the same in either case. The engine thus constitutes an example of the convergent cylinder type.

The member A comprises the peripheral shell A', stepped or jogged as at $a'$ (Fig. 1) to afford seats for the working cylinders $A^7$ which are so disposed that the axes of these cylinders are canted at an angle to the radius of rotation, for reasons presently to be explained. Side plates $A^2$ are secured to the shell A', and interior partitions $A^3$, $A^4$ are provided, and furnished with guide slots $A^5$ and $A^6$, these being parallel to the axes of the cylinders $A^7$, respectively. The cylinders $A^7$, contain pistons $A^8$, to which are secured piston rods $A^9$, which are forked to receive anti-friction rolls $A^{11}$, and guiding pintles $A^{10}$ which travel in the guide slots $A^5$, $A^6$. The rolls $A^{11}$ bear against and travel over the cam or eccentric $B^2$, which is secured to the shaft B'; suitable bearings, as the ball bearings $b'$ $b'$ are provided to facilitate the rotative movement which characterizes the relationship of the members A and B. The shaft B' carries also the cam $B^2$ and the offset, or crank-disk $B^4$, both of which are significant functionally in the special aspect of the engine as an internal combustion engine.

Referring to Fig. 1, the cam or eccentric $B^2$ is seen to have its rise and fall between the points marked 1 and 3, with the low point at 2. On the side opposite point 2, between points 3 and 1, the cam is concentric with the center of rotation, and therefore "dwells" between 3 and 1.

Assuming for the present that shaft B' and its attached parts is stationary, and that the cylinder-carrying member A rotates clockwise as viewed in Fig. 1, the piston of which the rod-roller is at the point marked 1 is at or near the head end of the cylinder. Assume also that a compressed combustible charge is at this point ignited in that cylinder. The full effective pressure on the piston head will be exerted on the cam $B^2$, the thrust being on a line offset from the center of rotation by a "crank-arm" or moment arm the length of which depends on the angle at which the cylinder axis is canted from the radius of rotation. The exertion of this pressure and the reaction between the piston rod-roll $A^{11}$ and the cam $B^2$ produces rotation, the member A with its cylinders turning clockwise in the case assumed. As the piston rod-roll passes over the surface of the cam $B^2$, from point 1 to point 2, the piston takes its full power stroke, at all times acting on the same moment arm or "crank-arm." The piston having reached the end of its power stroke at this point, the exhaust of the cylinder is opened (by means presently to be described) and the further movement of member A, which carries the piston rod roll up the rise of cam $B^2$ to point 3, returns the piston to the head end of its cylinder, driving the products of combustion before it. The cylinder then returns to the starting point of the cycle, the piston rod roll traveling over the cam-dwell from 3 to 1. During this period of dwell the exhaust is closed, and a fresh combustible charge introduced into the cylinder, in preparation for the next ensuing power stroke.

As all the cylinders $A^7$ come into action successively in the manner above described, the rotative torque is constant and the power economy high, because of the effective application of the piston thrust at all points during the power stroke. With the usual arrangement of piston and crank-arm, the maximum pressure per square inch is brought to bear on the piston at or near dead point, where the effort is exerted to the least advantage, and by the time the crank reaches the point of maximum leverage, the effective pressure has fallen considerably, as shown by the characteristic indicator diagram of a gas-engine. The constant effective crank-arm which results from the structure and relationship of working parts in the engine herein described affords a contrast to the conditions present in the standard form of engine.

The exhaust of the cylinders is controlled by exhaust valves D, of usual construction, in conjunction with the cam $B^3$ which forms part of the relatively rotatable member B. The lift and fall of these valves may be variously determined as to time and ratio of movement, within the limits imposed by the general design. The cam $B^3$ is shown in Fig. 1 as adapted to open each exhaust valve, through the latch D', and rod $D^2$ and roll $D^3$, at or near the time when the piston $A^8$ has arrived at the end of its power stroke and to close the exhaust valve at or about the time when the piston roll $A^{11}$ is passing the point 3 on the cam $B^2$.

The re-charge of the cylinders is effected by the compression cylinders C and their associated parts. Each compression cylinder C has a piston C', connected to the rod $C^2$, which in turn is pivoted at $C^3$ on the collar $C^4$ which turns on the pin $B^5$, carried by the offset $B^4$ on shaft B'.

The intake passage E is controlled by two valves, E' and $E^2$, which, for the sake of compact construction are made to slide, one within the other, valve E' being sleeved over the stem of valve E². Springs e', e² hold the valves E', E² against their respective seats. Between the valve seats lies the port F leading to the compression cylinder C.

As piston C' is withdrawn, the gaseous mixture (supplied by a suitable carbureter, which is not herein shown) is drawn into cylinder C, valve E' opening for the purpose. When piston C' returns into cylinder C, the charge in cylinder C is compressed, valve E' closing, and injected into the head end of the working cylinder A⁷, valve E² opening. When the piston C' reaches the end of its inward stroke, valve E² closes, even before the ignition of the compressed charge.

The cam or eccentric B² and the offset pin B⁵ are so placed that the compression of gaseous mixture in cylinders C takes place while the pistons of the working cylinders are at rest, on account of the dwell in the surface of cam B². The application of gas pressure on the pistons insures proper contact between cam B² and piston rolls A¹¹ before the ignition of the gaseous charge takes place.

Ignition is effected by means of the usual spark plugs, and a commutator or distributer, with leads appropriate to the number of working cylinders employed. These devices are not shown in the drawings.

Not only is there advantage to be gained by eliminating dead point, from setting the working cylinders at an angle to the radius of revolution, but also, this arrangement makes it possible to use a larger number of cylinders of given diameter, than would be the case with cylinders set with their axes radial to the center of rotation.

As the provision of a dwell in the operation of each working cylinder insures complete scavenging, the cylinders may be proportioned with a very long stroke in relation to diameter, so that the pressure on each charge may be reduced almost if not quite to atmospheric pressure before the exhaust valve D opens, and the exhaust issuing from the port $d$ will not be explosive. Thus an engine may be so designed on the principle characteristic of this invention as to be silent and yet employ no muffler. Elimination of back pressure is thus secured, in addition to other advantages.

What I claim and desire to secure by Letters Patent is:

In an engine, the combination of relatively rotatable active and reactive members, one equipped with a plurality of convergently directed working cylinders having their axes canted from a radius of rotation, pistons and piston rods for said cylinders, charging cylinders, valved connections between the charging cylinders and working cylinders, the other member comprising a cam of which the working surface is eccentric to the axis of rotation and against which the working cylinder piston rods bear, said cam provided with a dwell between maximum radii of its eccentric surfaces, said charging cylinders timed respectively to compress while their associated working cylinders pass said dwell.

Signed by me at Boston, Massachusetts this fifth day of May 1910.

GEORGE A. LOWRY.

Witnesses:
ODIN ROBERTS,
CHARLES D. WOODBERRY.

---

Copies of this patent may be obtained for five cents each, by addressing the "Commissioner of Patents, Washington, D. C."